United States Patent
Sakai

(10) Patent No.: US 9,699,389 B2
(45) Date of Patent: Jul. 4, 2017

(54) IMAGE DISPLAYING APPARATUS AND IMAGE DISPLAYING METHOD

(71) Applicant: OLYMPUS CORPORATION, Hachioji-shi, Tokyo (JP)

(72) Inventor: Koji Sakai, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/064,156

(22) Filed: Mar. 8, 2016

(65) Prior Publication Data
US 2016/0191819 A1    Jun. 30, 2016

Related U.S. Application Data

(63) Continuation of application No. PCT/JP2014/066024, filed on Jun. 17, 2014.

(30) Foreign Application Priority Data

Oct. 1, 2013  (JP) .................................. 2013-206230

(51) Int. Cl.
*H04N 5/262*     (2006.01)
*H04N 5/232*     (2006.01)
(Continued)

(52) U.S. Cl.
CPC ......... *H04N 5/2621* (2013.01); *G06F 3/0488* (2013.01); *G06F 3/04842* (2013.01);
(Continued)

(58) Field of Classification Search
None
See application file for complete search history.

(56) References Cited

U.S. PATENT DOCUMENTS 9,411,502 B2*   8/2016   Yang .................... G06F 3/0488
2009/0265664 A1*  10/2009  Shin ....................... H04N 5/232
                                                                715/810
(Continued)

FOREIGN PATENT DOCUMENTS

JP     2003-087553 A    3/2003
JP     2009-260691 A   11/2009
(Continued)

OTHER PUBLICATIONS https://www.youtube.com/watch?v=_uJxlA7Yjl4 Lightroom 5: Radial Filter, by Adobe Photoshop Lightroom, Jun. 13, 2013.*
(Continued)

*Primary Examiner* — James Hannett
(74) *Attorney, Agent, or Firm* — Volpe and Koenig, P.C.

(57) ABSTRACT

An image displaying apparatus comprises, an operation input detector for detecting a touch operation on a display screen of a display, an image position selection section for selecting position of part of an image that has been displayed on the display, an image identification section for recognizing an image region that has been selected based on image position that has been selected by the image position selection section, and a touch operation that has been detected by the operation input detector, as a main subject image region, and a special image processing section for applying special effect image processing to a region other than at least part of the main subject image region that has been selected, wherein the special image processing section varies the special effect processing intensity in accordance with a touch operation that has been detected by the operation input detector.

7 Claims, 18 Drawing Sheets

(51) Int. Cl.
  *G06F 3/0484* (2013.01)
  *G06F 3/0488* (2013.01)
  *H04N 5/272* (2006.01)
(52) U.S. Cl.
  CPC ..... *G06F 3/04845* (2013.01); *H04N 5/23216* (2013.01); *H04N 5/23245* (2013.01); *H04N 5/23293* (2013.01); *H04N 5/23296* (2013.01); *H04N 5/2628* (2013.01); *H04N 5/272* (2013.01)

(56) References Cited

U.S. PATENT DOCUMENTS

| | | | | |
|---|---|---|---|---|
| 2010/0130250 | A1* | 5/2010 | Choi | G06K 9/3241 455/556.1 |
| 2011/0109581 | A1 | 5/2011 | Ozawa | |
| 2012/0313977 | A1* | 12/2012 | Kwon | G06F 3/0488 345/684 |
| 2013/0293672 | A1 | 11/2013 | Suzuki | |
| 2016/0054851 | A1* | 2/2016 | Kim | G06F 3/0488 345/174 |
| 2017/0010746 | A1* | 1/2017 | Hotelling | G06F 3/0416 |

FOREIGN PATENT DOCUMENTS

| | | |
|---|---|---|
| JP | 2010-271774 A | 12/2010 |
| JP | 2011-135376 A | 7/2011 |
| JP | 2012-169723 A | 9/2012 |
| JP | 2013-055609 A | 3/2013 |
| JP | 2013-074301 A | 4/2013 |
| JP | 2013-135398 A | 7/2013 |
| JP | 2013-183244 A | 9/2013 |

OTHER PUBLICATIONS

International Search Report mailed in corresponding International Patent Application No. PCT/JP2014/066024 on Jul. 22, 2014, consisting of 4 pp. (English Translation Provided).

Office Action mailed in corresponding Japanese Patent Application No. 2015-540405 on Nov. 10, 2015, consisting of 3 pp.

Office Action mailed in corresponding Japanese Patent Application No. 2015-540405 on Feb. 26, 2016, consisting of 4 pp.

* cited by examiner

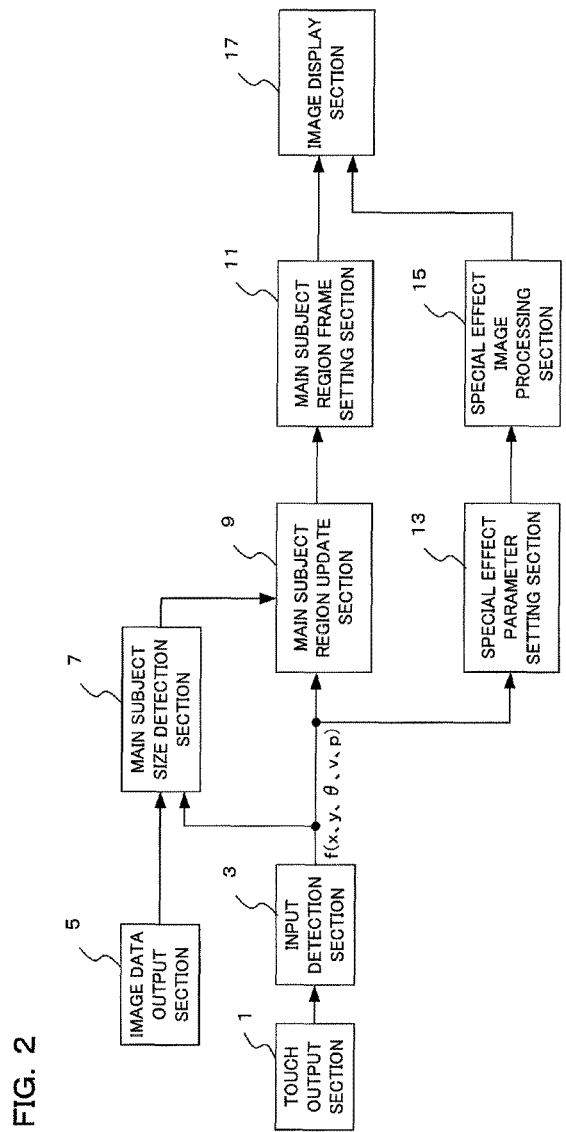

| DETECTION REGION | |Δx1| | |Δx2| | MAIN SUBJECT REGION SETTING | SPECIAL IMAGE PROCESSING |
|---|---|---|---|---|
| 1 | LESS THAN X0 (0) | LESS THAN X0 (0) | CIRCLE SHAPE (BASIC) | ZOOM PROCESSING DURING EXPOSURE |
| 1 | GREATER THAN OR EQUAL TO X0 (1) | LESS THAN X0 (0) | OVAL | ← |
| 1 | LESS THAN X0 (0) | GREATER THAN OR EQUAL TO X0 (1) | OVAL | ← |
| 1 | GREATER THAN OR EQUAL TO X0 (1) | GREATER THAN OR EQUAL TO X0 (1) | ZOOM | ← |
| 2 | THERE IS INPUT | | CANCEL | |

| MOVEMENT POSITION | UPDATE POSITION |
|---|---|
| $X < X_{MIN}$ | $X_{MIN}$ |
| $X_{MIN} \leq X_{MAX}$ | $X$ |
| $X \geq X_{MAX}$ | $X_{MAX}$ |

FIG. 13

| \|ΔX1\| | V1 | OPERATION | IMAGE PROCESSING |
|---|---|---|---|
| 0 | LESS THAN V0 (0) | ZOOM | ZOOM IN ALL DIRECTIONS (FIXED MAGNIFICATION FACTOR) |
| 0 | GREATER THAN OR EQUAL TO V0 (1) | SWIPE SMALL | ENLARGE ZOOM FACTOR FOR SWIPE DIRECTION |
| 1 | (0) | ZOOM | ZOOM IN ALL DIRECTIONS |
| 1 | (1) | SWIPE LARGE | ENLARGE ZOOM FACTOR FOR SWIPE DIRECTION |

| ΔX1 | ΔX2 | IMAGE PROCESSING |
|---|---|---|
| + DIRECTION | − DIRECTION | DO NOT CHANGE |
| − DIRECTION | + DIRECTION | DO NOT CHANGE |
| + DIRECTION | + DIRECTION | ROTATION AND COMBINATION IN + DIRECTION |
| − DIRECTION | − DIRECTION | ROTATION AND COMBINATION IN − DIRECTION |

FIG. 15

| P1 | P2 | IMAGE PROCESSING |
|---|---|---|
| P1<P0 (0) | P2<P0 (0) | NO CHANGE |
| (0) | P2≥P0 (1) | WAVEFRONT DEFORMATION CENTERED ON P2 |
| P1≥P0 (1) | (0) | WAVEFRONT DEFORMATION CENTERED ON P1 |
| (1) | (1) | WAVEFRONT DEFORMATION CENTERED ON P1 AND P2 |

IMAGE DISPLAYING APPARATUS AND IMAGE DISPLAYING METHOD

CROSS-REFERENCE TO RELATED APPLICATIONS

This application is a Continuation Application of PCT Application No. PCT/JP2014/066024, filed on Jun. 17, 2014 and based upon and claiming the benefit of priority from prior Japanese Patent Application No. 2013-206230, filed on Oct. 1, 2013, the entire contents of all of which are incorporated herein by reference.

BACKGROUND OF THE INVENTION

1. Field of the Invention

The present invention applies to an image display apparatus and image displaying method for applying a special effect to an image.

2. Description of the Related Art

In order to more dramatically finish a photographic work, optical filters are commercially available which cause an image of peripheral parts of a screen to be blurred or flow radially. Also, in order to create an effect where a main subject is shrouded in darkness, there is also a shooting technique to irradiate a spotlight on the main subject.

However, since it is assumed, with an optical filter, that the main subject will exist in a central part of a shooting screen, there is a disadvantage that a resulting photograph is likely to be uninteresting. A digital camera has therefore been proposed to apply a special effect to a designated range instead of creating a special effect using optical filters etc., in Japanese patent laid open publication No. 2013-55609 (hereafter referred to as patent publication 1).

With patent publication 1 described above, it is possible to apply a special effect in a designated range, but changing a region in which to apply the special effect, such as changing this designated range, is not simple.

SUMMARY OF THE INVENTION

An object of the present invention is to provide an image displaying apparatus and image displaying method that can easily change a region that will be subjected to special effect image processing.

An image displaying apparatus of a first aspect of the present invention comprises a display for displaying a still picture or movie image that has been taken, an operation input detector for detecting at least one of pressure, position change, direction, or velocity resulting from a touch operation on a display screen of the display, an image position selection section for selecting position of part of an image that has been displayed on the display, an image identification section for recognizing an image region that has been selected based on image position that has been selected by the image positions selection section, and at least one of position change and direction that have been detected by the operation input detector, as a main subject image region, and a special image processing section for applying special effect image processing to a region other than at least part of the main subject image region that has been selected, wherein the special image processing section varies the special effect processing intensity in accordance with at least one of pressure and speed of a touch operation, in a direction from the main subject image region towards the screen periphery, that has been detected by the operation input detector.

An image displaying method of a second aspect of the present invention comprises a display step of displaying a still picture or movie image that has been taken on a display, an operation input detection step of detecting at least one of pressure, position change, direction, or velocity resulting from a touch operation on a display screen of the display, a selection step of selecting position of part of an image that has been displayed on the display, a recognition step of recognizing an image region that has been selected based on the selected image position, and at least one of position change and direction that have been detected in the operation input detection step, as a main subject image region, and a special image processing step of applying special effect image processing to a region other than at least part of the main subject image region that has been selected, wherein the special image processing step varies the special effect processing intensity in accordance with at least one of pressure and speed of a touch operation, in a direction from the main subject image region towards the screen periphery, that has been detected in the operation input detection step.

A non-transitory computer-readable medium of a third aspect of the present invention, storing a computer program for controlling a computing device, the computer program comprising a display step of displaying a still picture or movie image that has been taken on a display, an operation input detection step of detecting at least one of pressure, position change, direction, or velocity resulting from a touch operation on a display screen of the display, a selection step of selecting position of part of an image that has been displayed on the display, a recognition step of recognizing an image region that has been selected based on the selected image position, and at least one of position change and direction that have been detected in the operation input detection step, as a main subject image region, and a special image processing step of applying special effect image processing to a region other than at least part of the main subject image region that has been selected, wherein the special image processing step varies the special effect processing intensity in accordance with at least one of pressure and speed that has been detected in the operation input detection step.

BRIEF DESCRIPTION OF THE DRAWINGS

FIG. 2 is a block diagram showing the structure relating to applying of special effect image processing of the digital camera of one embodiment of the present invention.

FIG. 13 is a chart showing one example of operation analysis of a first modified example, in the digital camera of one embodiment of the present invention.

FIG. 15 is a chart showing one example of operation analysis of a first modified example, in the digital camera of one embodiment of the present invention.

DETAILED DESCRIPTION OF THE PREFERRED EMBODIMENTS

An example where the present invention is adopted in a digital camera as one embodiment of the present invention will be described in the following. This digital camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Image data that has been stored in the storage medium can be played back and displayed on the display section if playback mode is selected.

Also, the digital camera of this embodiment is capable of carrying out special effect image processing (also called art filter processing) on a main subject region that has been selected based on subject position that has been detected using AF (Auto Focus) or a position that has been designated by the user using a touch panel or the like, and changing this image region using a touch panel operation of the user, during live view display or during playback display.

Figure 1A:
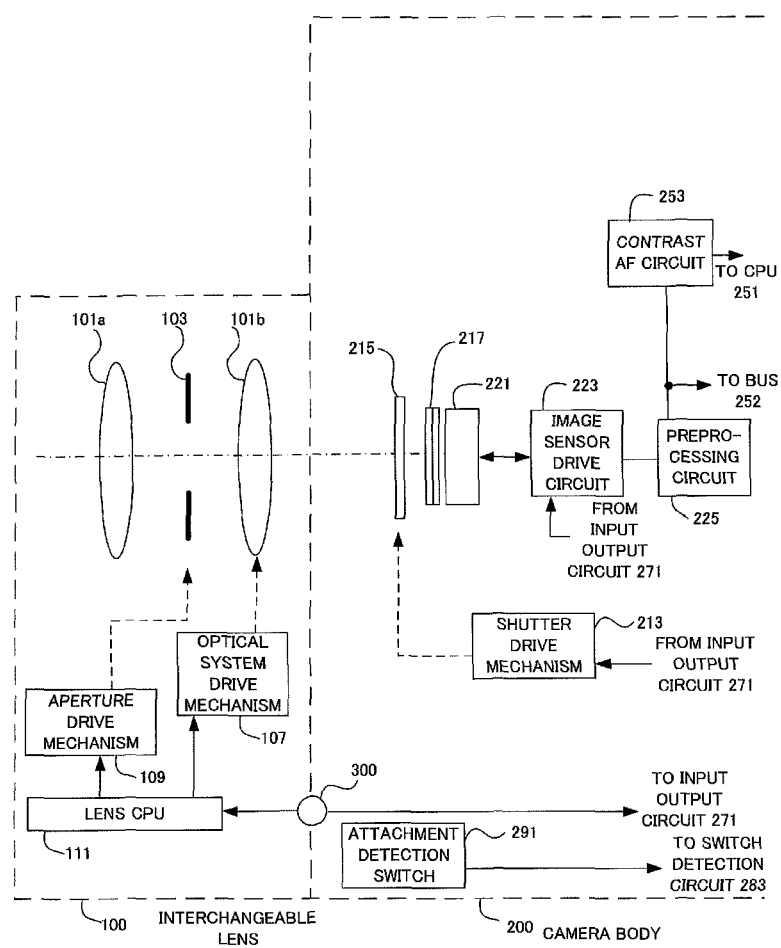
FIG. 1A and FIG. 1B are block diagrams mainly showing the electrical structure of a digital camera of one embodiment of the present invention.
Figure 1B:
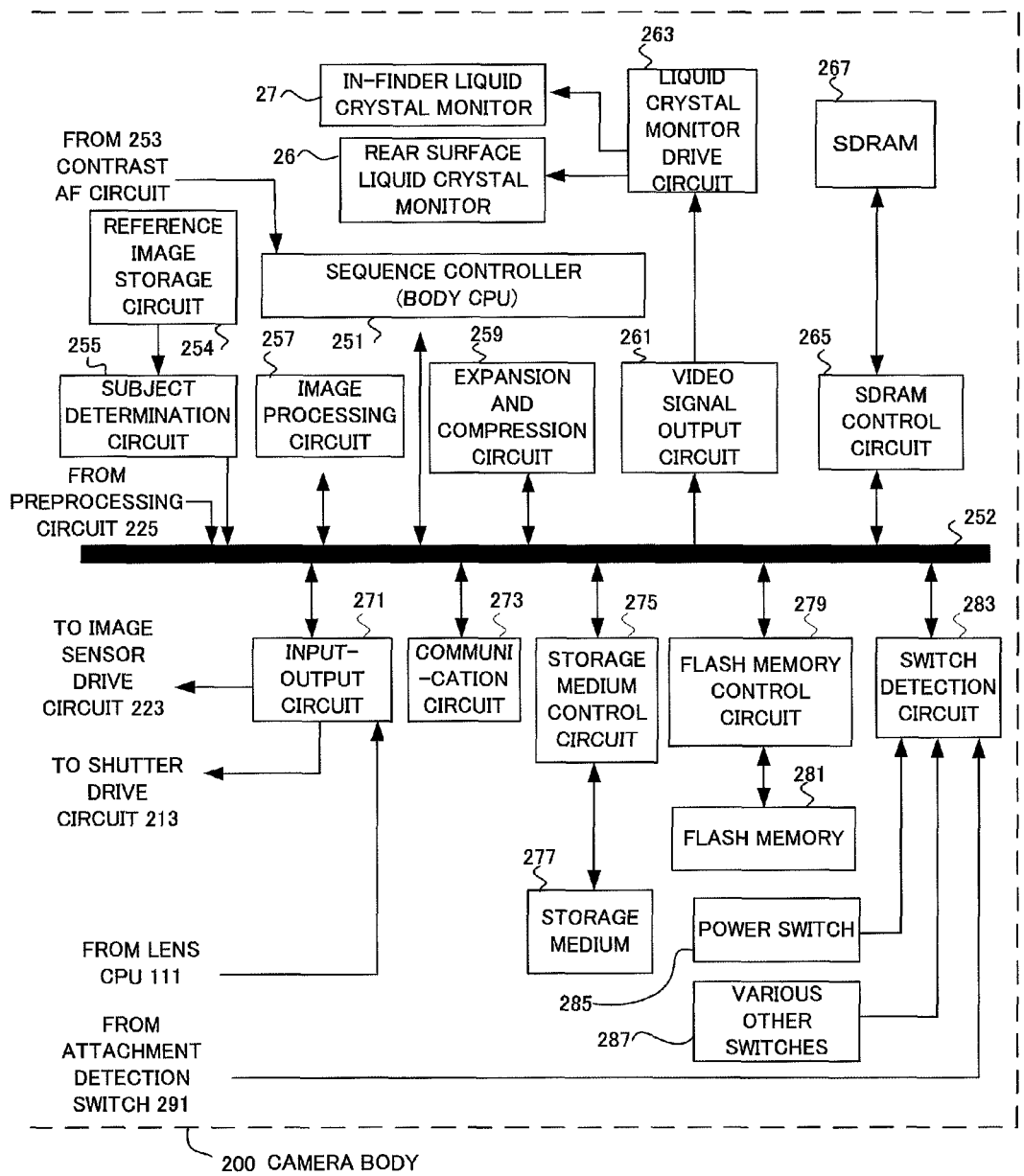

Next, the electrical structure of a digital camera, which is an example of one image displaying apparatus of this embodiment, will be mainly described using FIG. 1A and FIG. 1B. This digital camera comprises an interchangeable lens 100, and a camera body 200 to which this interchangeable lens 100 is attached. As well as the interchangeable lens type as in this embodiment, it is also possible to have a camera of the type where a lens barrel is fixed to the camera body.

A photographing optical system 101 for focusing and focal length adjustment (lens 101a, lens 101b), and an aperture 103 for adjusting aperture value, are arranged inside the interchangeable lens 100. The photographing optical system 101 is driven by an optical system drive mechanism 107, while the aperture 103 is driven by the aperture drive mechanism 109.

The optical system drive mechanism 107 and the aperture drive mechanism 109 are respectively connected to a lens CPU (Central Processing Unit) 111, and this lens CPU 111 is connected to the camera body 200 by means of the communication contact 300. The lens CPU 111 performs control inside of the interchangeable lens 100, controls the optical system drive mechanism 107 to perform focusing and zoom operations, and controls an aperture value by controlling the aperture drive mechanism 109.

A focal plane type shutter 215, an infrared cut filter and low pass filter 217, and an image sensor 221 are provided within the camera body 200, on the shooting optical axis of the photographing optical system 101. The shutter 215 is driven by a shutter drive mechanism 213, and allows subject light flux that has been formed by the photographing optical system 101 to pass for a given time.

The infrared cut filter 217 is an optical filter for removing an infrared component from subject light flux. The image sensor 221 photoelectrically converts a subject image formed by the photographing optical system 101 into electrical signals. Obviously a two dimensional image sensor such as a CCD (charge Coupled Device) image sensor or a CMOS (Complementary Metal Oxide Semiconductor) image sensor, may be used as the image sensor 221.

The image sensor 221 is connected to an image sensor drive circuit 223, and readout of image signals from the image sensor 221 etc. is performed by this image sensor drive circuit 223. The image sensor drive circuit 223 is connected to a preprocessing circuit 225, and the preprocessing circuit 225 performs preprocessing for image processing such as A/D conversion of the read out image signals, and cropping processing for pixel thinning processing for live view display.

The preprocessing circuit 225 is connected to a data bus 252. A sequence controller (hereafter referred to as a body CPU) 251, subject determination circuit 255, image processing circuit 257, compression and expansion circuit 259, video signal output circuit 261, SDRAM (Synchronous Dynamic Random Access Memory) control circuit 265, input/output circuit 271, communication circuit 273, storage medium control circuit 275, flash memory control circuit 279, and switch sensing circuit 283 are connected to this data bus 252.

The body CPU 251 that is connected to the data bus 252 controls operation of this digital camera in accordance with programs stored in flash memory 281, which will be described later. A contrast AF circuit 253 is connected between the previously described preprocessing circuit 225 and the body CPU 251. The contrast AF circuit 253 extracts a high frequency component based on an image signal output from the preprocessing circuit 225, and outputs contrast information to the body CPU 251 based on this high frequency information.

Figure 4A:
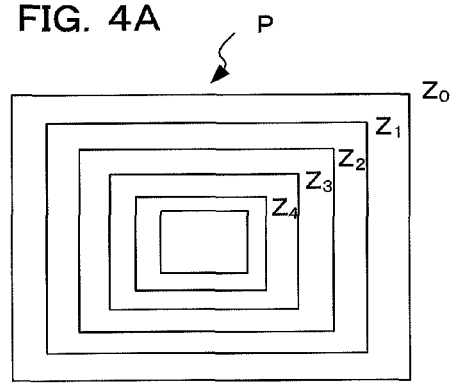
FIG. 4A and FIG. 4B are drawings for describing image processing for imparting a zoom effect, in the digital camera of one embodiment of the present invention.

The image processing circuit 257 that is connected to the data bus 252 carries out various image processing such as digital amplification of digital image data (digital gain adjustment processing), color correction, gamma (γ) correction, contrast correction etc. Also, this image processing circuit 257 fulfills a function as a special image processing section for applying various special effect image processing, such as a zoom effect, which will be described later, Diorama effect, ripple effect etc. on regions other than at least some regions that have been recognized to be a main subject image region removed. This special image processing section changes a special effect in accordance with at least one of pressure or speed of a touch operation in a direction from a main subject image region toward the image periphery, that has been detected by the operation input detector. In particular, in a case where a main subject image region has been set, the special image processing section clips images of a plurality of sizes from an image as zoomed images, then processes these plurality of clipped images so that they become the same size, and then generates a combined image (refer to FIG. 4).

Also, the image processing circuit 257 has a tracking function, with respect to a subject that has been determined to be a subject by the subject determination circuit 255. Specifically, position of a subject constituting a tracking target is detected every time an image signal is read out from the image sensor 221. The image processing circuit 257 also carries out image processing for electronic zoom, by clipping the image.

Also, the compression and expansion circuit 259 is a circuit for compressing image data stored in the SDRAM 267 using a compression system such as JPEG, TIFF etc. The image compression is not limited to JPEG and TIFF, and it is also possible to apply other compression systems.

The video signal output circuit 261 is connected to a rear surface liquid crystal monitor 26 and an in-finder liquid crystal monitor 27 via a liquid crystal monitor drive circuit 263. The video signal output circuit 261 is a circuit for converting image data stored in the SDRAM 267 or the storage medium 277 into video signals for display on the rear surface liquid crystal monitor 26 and the in-finder liquid crystal monitor 27.

The rear surface liquid crystal monitor 26 is arranged on the rear surface of the camera body 200, but as long as it is in a position that can be seen by the photographer it is not limited to the rear surface, and also is not limited to liquid crystal and can be another display device. The rear surface liquid crystal monitor 26 functions as a display for displaying a taken still picture or movie image. The in-finder liquid crystal monitor 27 is arranged within the camera body 200, and together with an eyepiece constitutes an electronic viewfinder.

The SDRAM 267 is connected via the SDRAM control circuit 265 to the data bus 252, and this SDRAM 267 acts as a buffer memory for temporarily storing image data that has been subjected to preprocessing by the preprocessing circuit 225, image data that has been subjected to image processing by the image processing circuit 257, or image data that has been compressed by the compression and expansion circuit 259. The above input/output circuit 271 that is connected to the image sensor drive circuit 223 and the shutter drive mechanism 213 control input and output of data between respective circuits such as the body CPU 251 via the data bus 252.

The communication circuit 273 that is connected to the lens CPU 111 via the communication contact 300 is also connected to the data bus 252, and carries out data exchange with the body CPU 251 etc. and communication for control commands. The storage medium control circuit 275 connected to the data bus 252 is connected to the storage medium 277, and performs control of storing image data etc. to this storage medium 277 and reading of image data etc.

The storage medium 277 is constructed so that any rewritable storage medium, such as xD picture card (registered trademark), Compact Flash (registered trademark), SD memory card (registered trademark) or memory stick (registered trademark) can be fitted, and is removably inserted into the camera body 200. Besides, it is also possible to have a configuration where it is possible to connect to a hard disc via a communication connection point.

The flash memory control circuit 279 is connected to a flash memory 281, and this flash memory 281 stores programs for controlling operation of the digital camera, and the body CPU 251 performs control of the digital single lens reflex camera in accordance with the programs stored in the flash memory 281. The flash memory 281 is an electrically rewritable non-volatile memory, and may be a memory other than flash memory as long as it is an electrically rewritable non-volatile memory.

A power switch 285 for carrying out on-off control of power supplied to the digital camera is connected via the data bus 252 to the switch sensing circuit 283. Various other switches 287, including a 1R switch for detecting a first stroke (half press) of the shutter release button and a 2R switch for detecting a second stroke (full press), are also connected via the data bus 252 to the switch sensing circuit 283. Also, as the various switches 297, there are a menu switch that is linked with a menu button, a playback switch which is linked with a playback button, and various other switches that are linked to other operation members.

A touch panel is also provided on a display surface side of the rear surface liquid crystal monitor 26, as part the various other switches. If the user performs a touch operation on the display surface of the rear surface liquid crystal monitor 26, this touch panel detects touch position (x, y, r, θ), touch velocity (v) and operation pressure (p) at this time, and outputs to the body CPU 251 via the switch sensing circuit 283.

An attachment detection switch 291 is arranged close to a body mount of camera body 200, and determines whether or not the interchangeable lens 100 has been attached to the camera body 200. Output of the attachment detection switch is connected to the data bus 252 via the switch sensing circuit 283.

Faces of people of various ages seen from various angles, various types and shapes of plants, and also facial images of pets such as cats and dogs etc. are stored in a reference image storage circuit 254 as specific subjects. The subject determination circuit 255 compares image data that has been input from the preprocessing circuit 225 via the data bus 252 with reference images stored in the reference image storage circuit 254, and determines whether or not the above specific subjects are contained within a taken image.

Next, the function of portions that are involved in special image processing will be described using FIG. 2 to FIG. 4B. Here, FIG. 2 is a functional representation block diagram when implementing the processes shown in FIG. 5 and FIG. 6 in the digital camera constructed as shown in FIG. 1A and FIG. 1B. Functional portions that are not directly related to this function have therefore been omitted. Also, unless otherwise stated, each of these sections is executed in software by the body CPU 251.

Figure 3A:
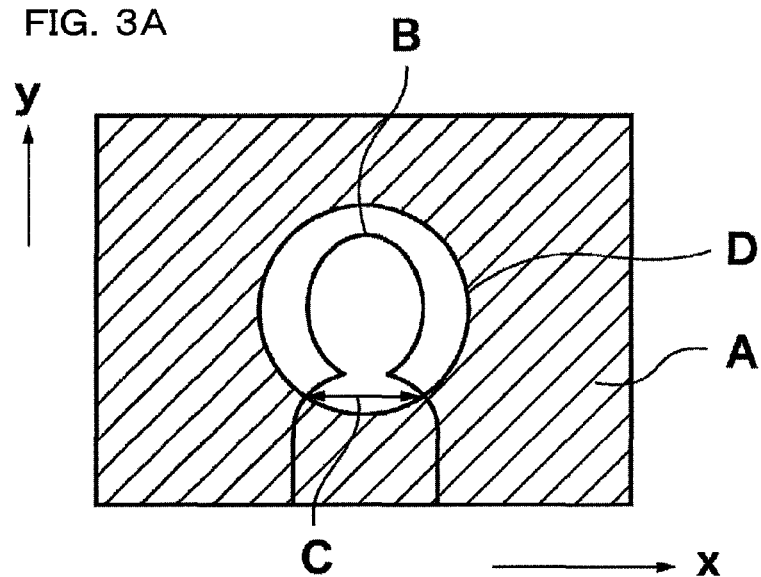
FIG. 3A and FIG. 3B are drawings showing display state of a display section and operating state of a touch panel, in the digital camera of one embodiment of the present invention.

In FIG. 2, a touch output section 1 outputs a detection result of a touch panel that is provided within the various other switches 287. Output of this touch output section 1 is output to an input detection section 3. The input detection section 3 detects a position (x, y) or (r, θ) where a touch operation has been carried out, as well as touch velocity (v) and operation pressure of the touch operation, based on detection results from the touch output section 1. Here, as shown in FIG. 3A, (x, y) is a position on an x axis and y axis that are orthogonal, while (r, θ) is distance r in a radial direction centered on a reference position within a screen, and angle θ with respect to a specified direction.

Figure 3B:
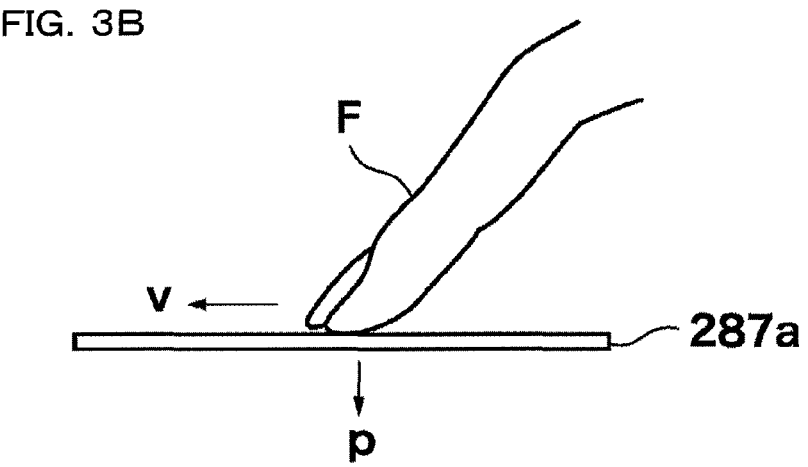

Also, as shown in FIG. 3B, touch velocity (v) is movement velocity when a finger F touches, while operation pressure (p) is pressing force on the touch panel 287a. Detection results from the input detection section 3 are output to a main subject size detection section 7, main subject region update section 9, and special effect parameter setting section 13. The touch output section 1 and the input detection section 3 function as an operation input detector for detecting a touch operation on the display screen of the display section. This operation input detector detects at least one of pressure, position change, direction, and velocity from the touch operation.

The image data output section 5 outputs image data, such as image data based on image signals from the image sensor 221, or image data, stored in the storage medium 277, that has been read out from the storage medium control circuit 275, to the main subject size detection section 7.

The main subject size detection section 7 receives, as input, output from the input detection section 3 and an image data output section 5, identifies a main subject, and detects the size of that main subject. Specifically, a main subject is detected based on a subject that has been determined by the subject determination circuit 255, or detection results of a touch operation from the touch panel. Also, if a main subject is detected, the size of that subject is detected by the image processing circuit 257. Detection results of the main subject size detection section 7 are output to the main subject region update section 9. The touch output section 1 and the main subject size detection section 7 etc. function as an image position selection section for selecting position of a part of an image that has been displayed on the display section, and an image identification section for identifying an image region that has been selected based on at least one of image position that has been selected by the image position selection section and position change and direction that have been detected by the operation input detector, as a main subject image region.

The main subject region update section 9 that is input with detection results from the input detection section 3 and the main subject size detection section 7 carries out update of a main subject region. In the event that a subject has been recognized by the subject determination circuit 255, or after a subject has been designated by a touch operation of the touch panel, if a subject region has been changed by a touch operation etc., update of a main subject region is carried out. The main subject region update section 9 functions as an image region update section for updating a main subject region that has been identified by the image identification region in accordance with at least one of pressure, position change, direction, or velocity variation amount that have been detected by the operation input detector (touch output section 1, input detection section 3 etc.). A method for this region update will be described later using FIG. 5 and FIG. 6.

An updated result of the main subject region update section 9 is output to a main subject region frame setting section 11. This main subject region frame setting section 11 sets a region frame for the main subject at the time of displaying an image on the image display section 17. Specifically, as shown in FIG. 3A, the main subject region frame setting section 11 displays a main subject region frame D taking into consideration the main subject size C with respect to the main subject region B, within the special effect processing region A. In this way, the main subject region frame D including at least part of the main subject region B is shown as a frame.

The special effect parameter setting section 13 that is input with detection results from the input detection section 3 and the main subject size detection section 7 sets parameters for special effect image processing that will be carried out in the image processing section 257. As parameters, in a case where zoom effect has been set as a special effect, for example, there are zoom ratio, number of image combinations etc. or, in a case where Diorama the effect has been set as the special effect, there are parameters such as filter blur amount etc. In a case where ripple effect has been set as the special effect, there are amplitude dependent distortion, wavelength value etc.

Parameters that have been set by the special effect parameter setting section 13 are output to the special effect image processing section 15. The special effect image processing section 15 is part of the image processing section 257 and applies various special effects such as zoom, Diorama, ripple etc.

Figure 4B:
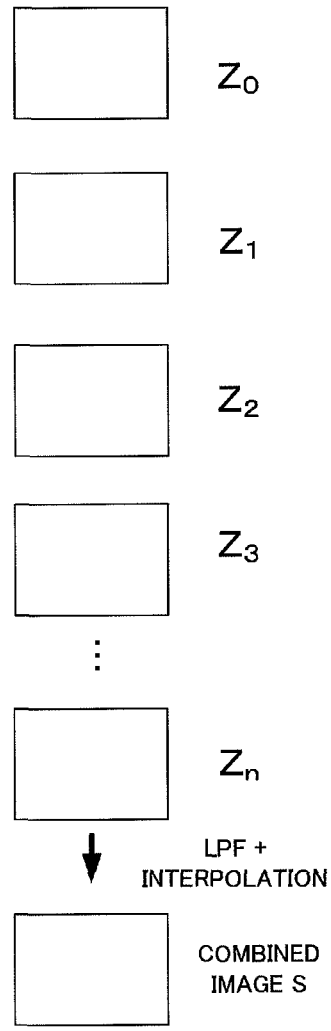

Zoom effect is clipping images Z0, Z1, Z2, Z3, . . . Zn from the original image P shown in FIG. 4A, as images that have been subjected to zooming. Then, as shown in FIG. 4B, images that have been subjected to interpolation processing so that the respective images become the same size, and have also been subjected to low pass filter processing, are respectively generated, and these generated images are further combined to form a combined image S. Since this combined image S has a central portion that is kept in focus but the peripheral is blurred, as the image is made large, an image is obtained that appears to have been taken while optically zooming from the wide-angle side to the telephoto side during exposure. The original image P may also be a still image, and images Z1-Zn may be sequentially clipped from continuously captured images. The present invention is not limited to the above-described examples, and it is also possible to generate and combine images that have been optically zoomed from the telephoto side to the wide-angle side.

The image display section 17, that is input with the outputs of the previously described special effect image processing section 15 and main subject region setting section 11, performs live view display and playback display, and performs display of an image that has been subjected to special effect image processing. In the block diagrams of FIG. 1A and FIG. 1B the rear surface liquid crystal monitor 26 plays the main role in display, but this is not limiting, and a display panel such as organic EL may also be used, and providing the display on the rear surface is also not limiting, and the display may be provided at another location. The in-finder liquid crystal monitor 27 may also be used as long as it is possible to carry out selection of image position.

Figure 5:
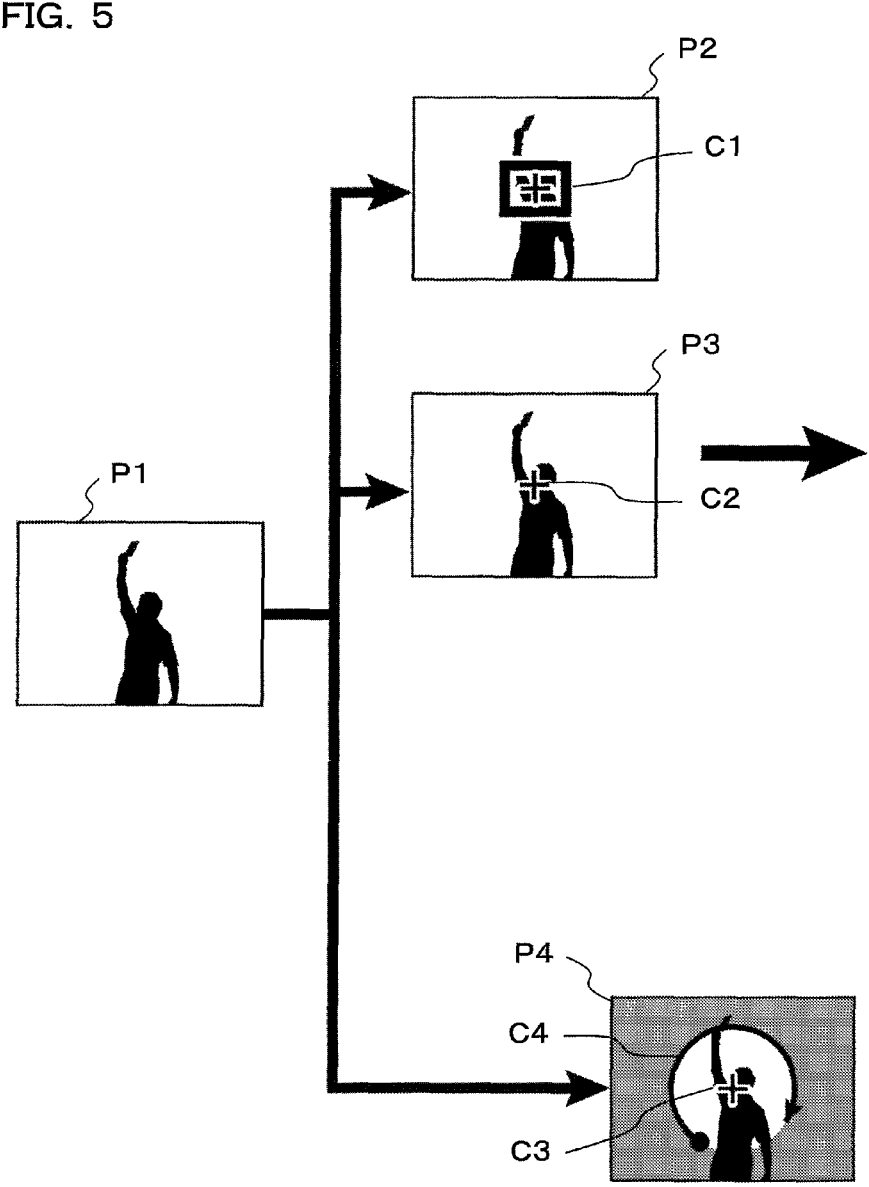
FIG. 5 is a drawing for describing an overview of special effect image processing in the digital camera of one embodiment of the present invention.

Next, one example of applying a special effect of this embodiment will be described using FIG. 5 and FIG. 6. In these drawings, description will be given with the zoom effect that was described using FIG. 4A and FIG. 4B as special effect image processing. It goes without saying that special effect image processing other than the zoom effect may also be applied as special effect image processing. Image P1 in FIG. 5 is a live view image, and in order to carry out special effect image processing on this image P1 a main subject region is set (refer to images P2, P2 and P3 in FIG. 5, and image P11 in FIG. 6). It should be noted that besides the live view image, a playback image that has been read out from the storage medium 277 may also be used.

Image P2 and image P3 in FIG. 5 show examples of determining centers for the purpose of carrying out special effect image processing. Image P2 in FIG. 5 shows an example where a focus point that has been selected as a main subject by the subject determination circuit 255 and focused on by the contrast AF circuit 253 is determined to be a center point C1. Also, image P3 in FIG. 5 shows an example where center point C2 has been designated by the user performing a touch operation on the touch panel (refer to FIG. 3B).

If a center has been determined, as in images P2 and P3 in FIG. 5, next it is possible for the user to appropriately set a main subject region that will be used in order to apply special effect image processing. The example shown in image P11 in FIG. 6 is a case where a circular range has been set in advance. Regarding this circular range selection, if the user performs a touch operation with a finger F on the screen, the inside of the circle having a radius of a line that joins the center point C3 and the touch point is selected as a main subject region. If a main subject region has been selected, the special effect image processing section 15 applies image processing for the zoom effect to a region other than the main subject region, as shown in image P12 in FIG. 6. It should be noted that the effect intensity is set to a default value.

Figure 6:
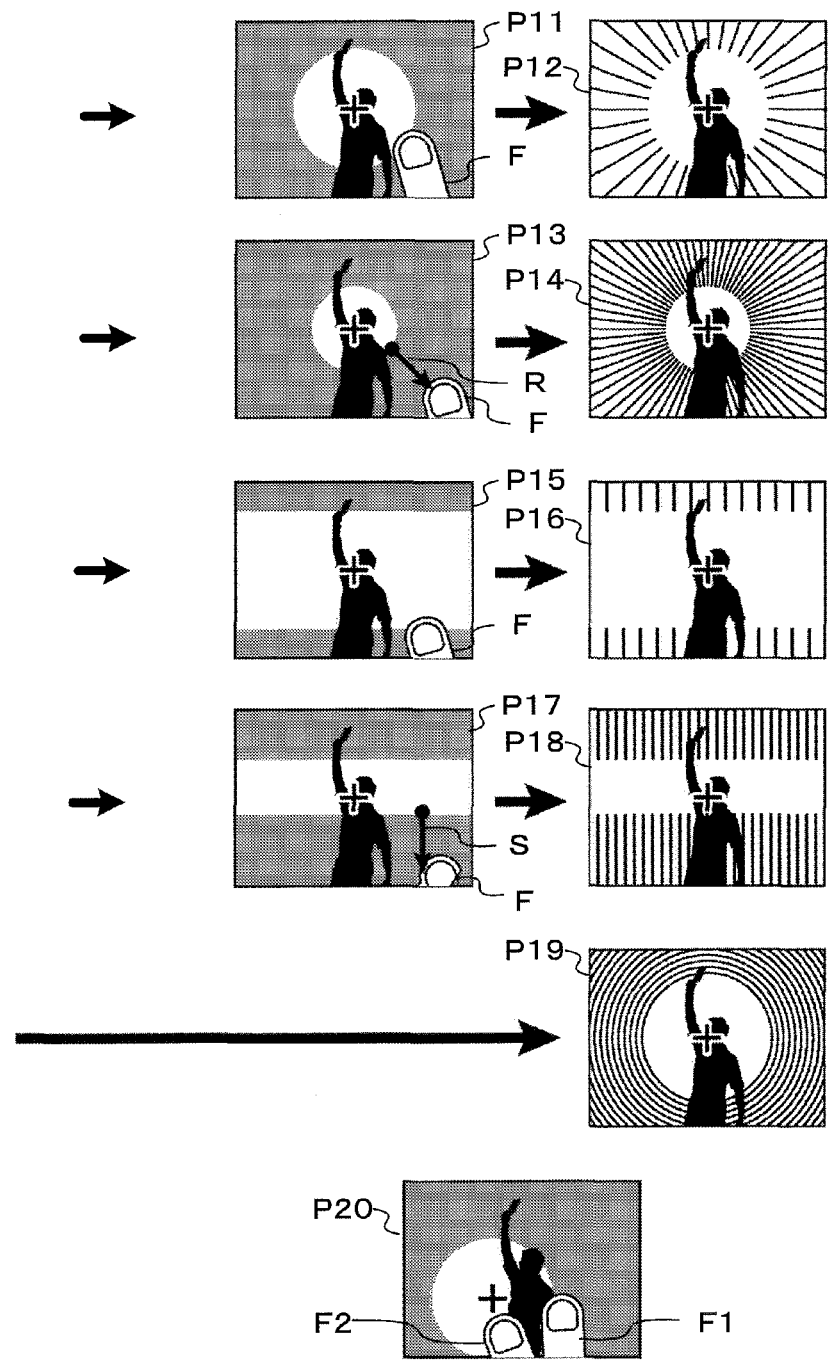
FIG. 6 is a drawing for describing an overview of special effect image processing in the digital camera of one embodiment of the present invention.

The example shown in image P13 of FIG. 6 is for a case of circular range selection, and where effect intensity setting is carried out. With the example that was shown in images P11 and P12 of FIG. 6 effect intensity (intensity of special effect image processing) has been set to the default value, but there may be situations where it is desired to change the effect intensity. With this example therefore, the special effect image processing section 15 applies the special effect so as to result in image P14 in FIG. 6 in which effect intensity has been changed in accordance with touch velocity v, operation pressure p etc. at the time of carrying out a slide operation from the center in a radial direction R.

The example shown in image P15 in FIG. 6 is a case where a linear range has been set as a main subject region. In the images P11 and P13 in FIG. 6 a circular range was selected, but with this example a rectangle is selected. Specifically, if a touch operation is performed with a finger F a rectangle with a lower side (upper side) of that touch position is selected as the main subject region. If a main subject region has been selected, the special effect image processing section 15 applies image processing for the zoom effect to a region other than the main subject region, as shown in image P16 in FIG. 6. It should be noted that the effect intensity is set to a default value.

The example shown in image P17 of FIG. 6 is for a case of linear range selection, and where effect intensity setting is carried out. With the example that was shown in images P15 and P16 of FIG. 6 effect intensity (intensity of special effect image processing) has been set to the default value. With this example, the special effect image processing section 15 applies the special effect so as to result in image P18 in FIG. 6 in which effect intensity has been changed in accordance with touch velocity v, operation pressure p etc. of a finger F at the time of carrying out a slide operation from the center in a direction S toward the upper side or the lower side.

With the above descriptions the center point C is determined first, but this is not limiting, and the main subject region may be determined without including a center point. In the example shown in image P4 in FIG. 5, if the user carries out a slide operation so as to draw an enclosing trace, this trace is approximated to a circle shape and set to a circle C4. In this case, a parameter for special effect image processing is set in accordance with velocity v and operation pressure p of the slide operation, and distance from the center point C3 etc.

If a circle C4 is determined, as in image P4 in FIG. 5, the region of this circle C4 constitutes a main subject region. The special effect image processing section 15 then applies image processing for the zoom effect to the outside of the circle C4, to obtain image P19 in FIG. 6. In this case, as was described previously, the effect intensity may be changed in accordance with velocity v and operation pressure p of the slide operation.

All of the previously described examples of images P1 to P19 have a center point positioned in the center of a screen, but naturally this position may differ depending on focus position of the subject, and a user's touch operation position. It is also possible, once a center point has been set, to move it by means of a slide operation. Image P20 in FIG. 6 is an example where a circular range is moved by a slide operation using two fingers, namely finger F1 and finger F2. Movement using this manual operation will be described later using S63 and S65 in FIG. 9, and FIG. 11A and FIG. 11B.

Next, operation of this embodiment will be described using the flowcharts shown in FIG. 7 to FIG. 9. These flowcharts (also including the flowcharts shown in FIG. 12, FIG. 16, and FIG. 17, that will be described later) are executed by the body CPU 251 controlling each section within the camera body in accordance with programs stored in the flash memory 281.

Figure 7:
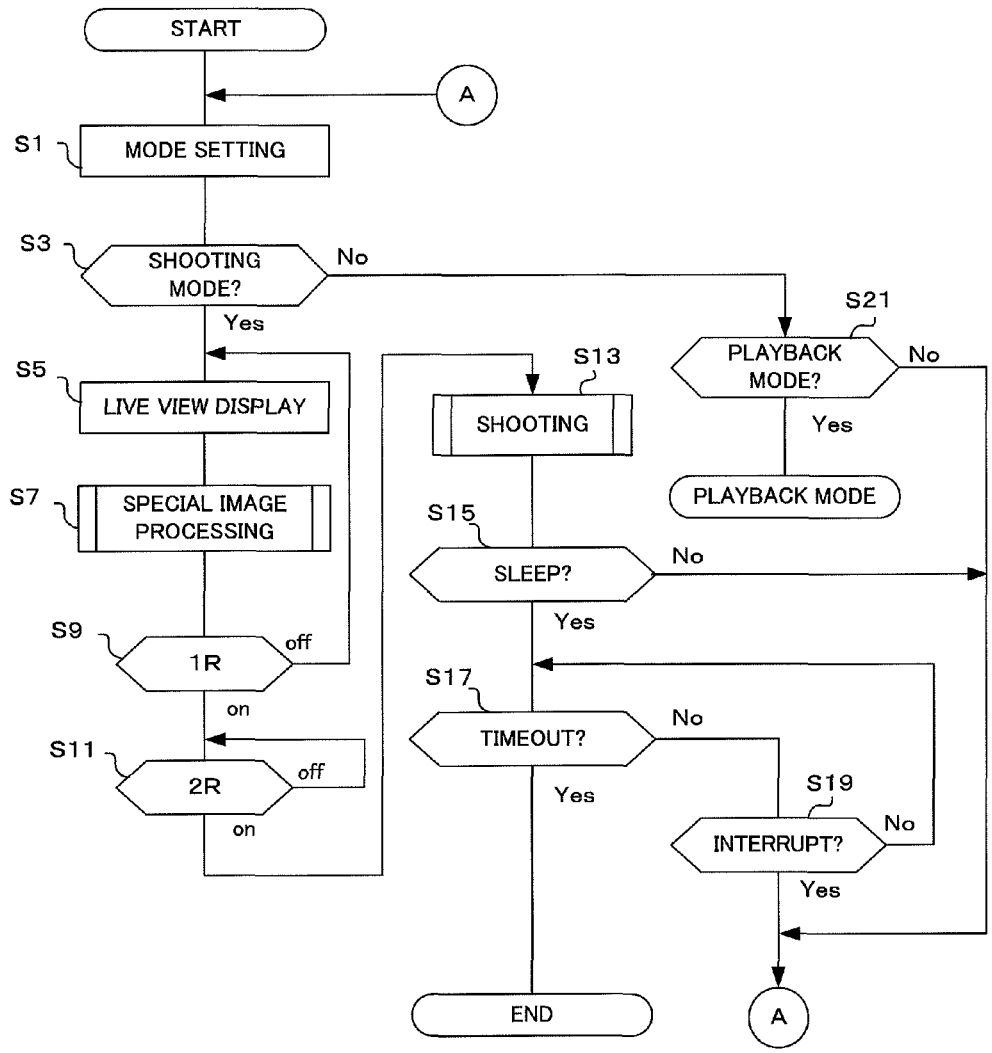
FIG. 7 is a flowchart for describing main operation of the digital camera of one embodiment of the present invention.

If the processing flow shown in FIG. 7 starts, first mode setting is carried out (S1). Here, setting such as shooting mode or playback mode is carried out, and various settings such as switching of movie shooting are carried out. It is also possible to set shape of the main subject region (for example, circular or rectangular), or the like. Once mode setting has been carried out, it is next determined whether or not it is shooting mode (S3). Here, determination is based on the setting in step S1.

If the result of determination in step S3 is shooting mode, then live view display is carried out (S5). Here, the image processing circuit 257 etc. carries out image processing for live view display on image signals from the image sensor 221, and displays a subject image on the rear surface liquid crystal monitor 26 and the in-finder liquid crystal monitor 27 as a movie image.

If live view display has been carried out, special image processing is next carried out (S7). Here, as was described using FIG. 5 and FIG. 6, the special effect image processing section 15 applies special effect image processing to a region other than a region that has been selected as a main subject image region. Detailed operation of this special image processing will be described later using FIG. 9.

If special image processing has been carried out, it is next determined whether 1R is on or off (S9). Here it is determined whether a 1st release switch (1R), which is one within the various other switches 297, is on or off. If the release button is pressed down half way, 1R is turned on. If the result of this determination is that 1R is off, processing returns to step S5.

On the other hand, if the result of determination in step S9 is that 1R is on, it is next determined whether R2 is on or off (S11). Here it is determined whether a 2nd release switch (2R), which is one within the various other switches 297, is on or off. If the release button is pressed down further from the half pressing and a fully pressed state is entered, 2R is turned on. If the result of determination is that 2R is off, there is a wait until 2R is turned on.

On the other hand, if the result of determination in step S11 is that 2R is on, shooting is carried out next (S13). Here, image processing for storage is carried out by the image processing circuit 257 etc. on image signals from the image sensor 221, and image data is stored in the storage medium 277. It should be noted that in the case of movie shooting mode, start of recording of an action in response to a start operation such as a movie button etc., and completion of recording of a movie in response to a stop operation etc. may be in accordance with operations for movie shooting.

Once shooting has being carried out, it is next determined whether or not the camera is in a sleep state (S15). In order to prevent excessive power consumption, if there has been no camera operation for a given time a sleep state, which is a low power consumption mode, is entered. In this step, it is determined whether or not the camera is in the sleep state. If the result of this determination is not sleep, processing returns to step S1.

If the result of determination in step S15 is not sleep, it is next determined whether or not there is a timeout (S17). If a given time has further a lapsed since the sleep state was entered, the power supply is turned off. In this step it is determined whether or not this given time has elapsed.

If the result of determination in step S17 is not timeout, it is determined whether or not an interrupt has occurred (S19). If the sleep state has been entered, the body CPU 251 commences a startup operation only if a given operating member has been operated. In this step, it is determined whether or not this interrupt operation has been performed. If the result of this determination is that there is no interrupt, processing returns to step S17, while if there is an interrupt processing returns to step S1. Also, if the result of determination in step S19 is that there is a timeout, this operation is terminated and the power supply is turned off.

If step S3 is return to and the result of determination in this step is that it is not shooting mode, it is next determined whether or not the camera is in playback mode (S21). Determination in this step is based on the mode setting in step S1. If the result of this determination is not playback mode, processing returns to step S1. It should be noted that in the case of modes other than shooting mode and playback mode, whether or not there are other mode settings may be judged, and other modes may be executed. On the other hand if the result of determination is playback mode, playback mode is executed. This playback mode will be described using FIG. 8.

Figure 8:
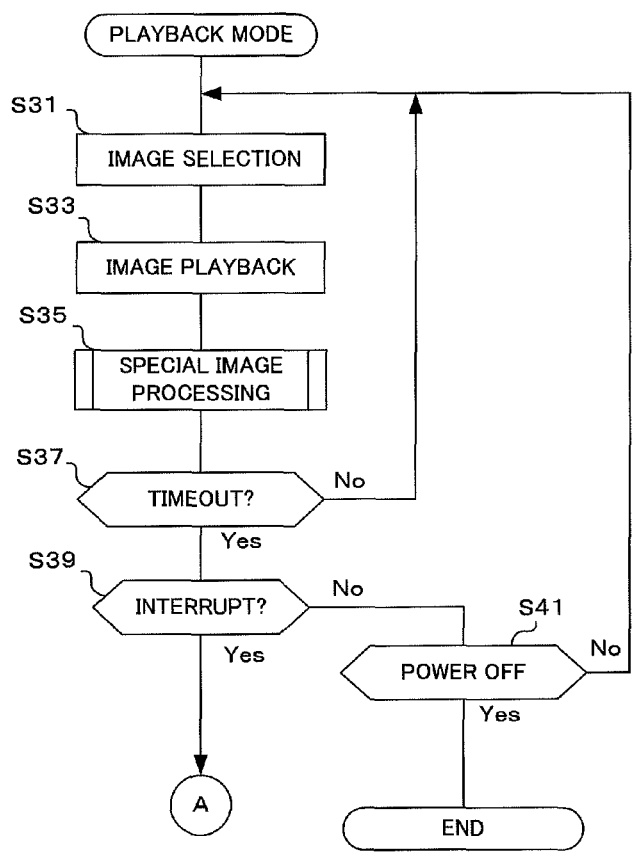
FIG. 8 is a flowchart for describing operation of playback mode of the digital camera of one embodiment of the present invention.

If the playback mode shown in FIG. 8 is entered, first image selection is carried out (S31). Here, thumbnail display is carried out on the rear surface liquid crystal monitor 26 etc., and the user selects an image using a cross shaped button, which is one among the various other switches 297, or the touch panel. Once image selection has been carried out, next image playback is carried out (S33). Here, the image that was selected in step S31 is read out from the storage medium 277 and displayed on the rear surface liquid crystal monitor 26 or the like.

If image playback has been carried out, special image processing is carried out (S35). Here, for an image that has been read out from the storage medium 277, similarly to step S7, the special effect image processing section 15 applies special effect image processing to a region other than a region that has been selected as a main subject image region. Detailed operation of this special image processing will be described later using FIG. 9.

If special image processing has been carried out, it is next determined whether or not there is a timeout (S37). If a given time has elapsed, during playback display, since the last operation was carried out, the power supply is turned off. In this step it is determined whether or not this given time has elapsed. If the result of this determination is that there is not a timeout processing returns to step S31 and playback mode continues.

On the other hand, if the result of determination in step S37 is that there is a timeout, it is determined whether or not an interrupt has occurred (S39). If the result of this determination is that there is an interrupt, processing returns to step S1. On the other hand, if the result of determination in step S39 is that there is not an interrupt, it is determined whether or not the power supply is off (S41). Here it is determined whether or not the power switch 285 has been turned off. If the result of this determination is not that the power supply is off, processing returns to step S31 and playback mode continues. On the other hand if the result of determination in step S41 is that the power supply is off, this operation flow is terminated. It should be noted that in the playback mode of FIG. 8 also, similarly to the flow in FIG. 7, the sleep state may be entered.

Next, detailed operation of the special image processing in step S7 (FIG. 7) and step S35 (FIG. 8) will be described using the flowchart shown in FIG. 9. With special image processing such as for zoom effect, diorama or ripple (also called art filter processing), the user sets the type of special image processing in advance on a menu screen. IL should be noted that besides setting the type of special image processing on a menu screen, setting in advance is not necessary as long as there is a correlation between the type of special image processing and an action at the time of a touch operation, for example, an action such as multi-touch, tap, or slide etc.

If the flow for special image processing is entered, it is first determined whether or not there is touch panel input (S51). Here, whether or not there is touch input is determined based on a detection result of the input detection section 3, that has been output from the touch output section 1. If the result of the determination is that there is no touch panel input, the originating flow is returned to.

If the result of determination in step S51 is that there is touch panel input, it is next determined whether or not region setting has already been performed (S53). As was described using image P4 in FIG. 5 and images P11, P13, P15 and 017 in FIG. 6, if the user carries out a touch operation or slide operation on the display screen of the image display section 17, it is possible to set a main subject region. In this step it is determined whether or not this region setting has already been performed.

If the result of determination in step S53 is that region setting has not yet been carried out, setting of the main subject region is carried out (S55). Here, as was described using image P4 in FIG. 5 and images P11, P13, P15 and P17 in FIG. 6, setting of a main subject region is carried out in response to a touch operation etc.

Once setting of the main subject region has been carried out, next parameter setting for special image processing is carried out (S57). Here, the special effect parameter setting section 13 carries out parameter setting in accordance with the type of special effect image processing that has been set, and the intensity of effect that was described using image P4 in FIG. 5 and images P11, P13, P15 and P17 in FIG. 6.

If special image processing parameter setting has been carried out, next designated image processing is carried out (S59). Here, the special effect image processing section 15 applies special effect image processing to a region other than the main subject region, in accordance with the type of special effect image processing that has been set and the parameters that have been set.

Once designated image processing has been carried out, image display is next carried out (S61). Here, an image resulting from carrying out the special effect image processing on a region other than the main subject region in step S59 is displayed on the image display section 17.

Once display update has been carried out, it is next determined whether or not the main subject has moved (S63). As described previously, since the image processing section 257 has a function of tracking the subject the main subject of the main subject region that was set in step S55 is tracked, and whether or not the main subject has moved is determined based on the result of this tracking. Also, as has been described using image P20 in FIG. 6, with this embodiment it is possible to perform movement of the main subject by performing a touch operation at two points simultaneously. This manual movement of the main subject will be described using FIG. 11A and FIG. 11B.

If the result of determination in step S63 is that the main subject has moved, movement of the main subject region is then carried out (S65). Here the main subject region update section 9 performs movement of the main subject region. Also, if the result of determination in step S63 is that the main subject has not moved, the originating flow is returned to.

Returning to step S53, if the result of determination is that the region has already been set, operation analysis is carried out (S63). Since the main subject region has already been set and a touch operation or slide operation has been performed in this state, the action of this touch operation etc. is analyzed. A specific example of this operation analysis will be described using FIG. 10A and FIG. 10B.

If operation analysis has been carried out, it is next determined whether or not the special effect image processing that has been set is zoom (S69). If the result of this determination is that zoom has been set, the main subject region is zoomed (S71). As was described using FIG. 4A and FIG. 4B, the zoom effect is image processing to perform zooming of the main subject so as to give the impression of flow. Here the main subject region is enlarged by zooming. Once this processing has been carried out processing advances to step S57, and special effect image processing to render the zoom effect is carried out.

On the other hand, if the result of determination in step S69 was not zoom, it is determined whether or not there is an action to depict an oval (S73). In the description that used FIG. 5 and FIG. 6, in selection of the main subject region there was only a circle, but in this flow it is possible to select not only a circle but also an oval shape as the main subject region. In selection of an oval shape, since the touch operation involves touching the two points, in this step determination is based on the number of touch operation points output from the input detection section 3

If the result of determination in step S73 is that there is an oval, the main subject region is ovalised with position on extensions of an oval designation and a circle center as reference (S75). Here, the main subject region update section 9 ovalizes the main subject region based on touch operation points. Once this processing is been carried out, processing advances to step S57, and designated image processing is carried out based on the main subject region that has been ovalised.

On the other hand, if the result of determination in step S73 was not an oval, it is determined whether or not there is a cancel (S77). Cancel setting, is carried out, for example, by performing a touch operation on other than a given display region of the image display section 17 (refer to the detection regions 2 in FIG. 10B). In this step, therefore, determination is based on position of the touch operation that has been output from the input detection section 3. It should be noted that cancel setting is not limited to this method, and cancel may be performed, for example, by an operation such as of a cancel button for special effect image processing.

If the result of determination in step S77 is that there is not a cancel, it is next determined whether or not there is a timeout (S79). Here it is determined whether or not a timer, which measures time from the last camera operation, has exceeded a given time. If the result of this determination is that there is not a timeout, the originating flow is returned to On the other hand, if the result of determination in step S79 is timeout, or if the result of determination in step S77 is that there is a cancel, special image processing is terminated (S81). If special image processing is terminated, the originating flow is returned to.

Next, one example of the operation analysis of step S67 will be described using FIG. 10A and FIG. 10B. FIG. 10A shows demarcation of detection regions of a touch panel on the image display section 17. As shown in FIG. 10B, the detection regions are divided into detection regions 2 at the upper right corner, lower right corner, up the left corner and lower left corner of the screen, and a large detection region 1 including a central portion. As shown in the lower row in the table of FIG. 10A, the detection regions 2 are used for cancellation of special effect image processing (refer to S77 in FIG. 9).

Also, the descriptions |Δx1| and |Δx2| in the upper row of FIG. 10A are time variation amounts of respective touch positions in the case of a two-point touch operation (slide operation). It should be noted that in the case where a region is circular there may be only a single point, and so the other point may be determined as being fixed. As will be understood from FIG. 10A, in a case where change amounts of touch operation points are less than X0, the main subject region is set to a circle. Also, in a case where change amount of one of two touch operation points is X0 or greater, the main subject region is set to an oval. If change amounts of both of the two touch operation points are X0 or greater, the main subject region is zoomed (specifically, the range of the region is widened, or narrowed).

Also, in this flow, as the special image processing show in FIG. 10A, inter-exposure zoom processing (zoom effect) is applied in step S57 and after. It should be noted that with display time brightness may changed over time, and saturation may change over time.

Figures 11A, 11B:
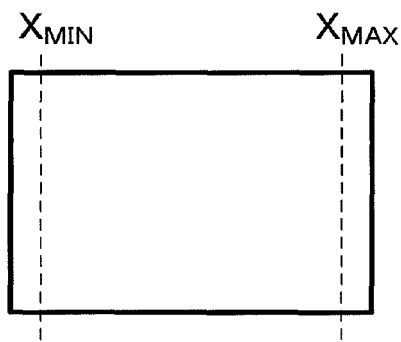
FIG. 11A and FIG. 11B are charts showing one example of a movement operation of a main subject region, performed manually, in the digital camera of one embodiment of the present invention.

Next, movement of the main subject region by a manual operation in step S65 will be described using FIG. 11A and FIG. 11B. In FIG. 11A a movement position X shown in the movement position column represents movement position of fingers F1 and F2 (refer to image P20 in FIG. 6). Here it is necessary for the fingers F1 and F2 to be moved in the same direction, and to be on the main subject region (circular section). Also, in FIG. 11A, position $X_{MIN}$ and position $X_{MAX}$ represents positions close to the right side and the left side of the touch panel on the image display section 17, as shown in FIG. 11B. This is in order to prevent the main subject region being deleted in the event that the fingers F1 and F2 have moved beyond the two sides of the touch panel.

It should be noted that the movement position X is made to be a center of a circle representing the main subject region, but this is not limiting, and may be a specified position with respect to circumferential movement direction. In this case movement position X may be set taking into consideration edges of the region. Also, in FIG. 11A and FIG. 11B, only X direction movement has been represented, but the same processing may also be performed for the Y direction.

In this way, in the flow for special image processing it is possible to set the main subject region with a touch operation (refer to S53 and S57), and it is possible for this region to be to various shapes using a touch operation (for example, a circle (P11 and P13 in FIG. 6), a rectangle (P15 and P17 in FIG. 6), or an oval (S73 and S75)). Also, even after region setting it is possible to change the region by a further touch operation or the like (S67). Further, if the main subject moves the main subject region also moves in accordance with this movement (S63 and S65). As a result there is the advantage that in the event that the subject has moved, it is not necessary to set the main subject region again. It is also possible to carry out movement of the main subject region manually (refer to FIG. 11A and FIG. 11B). There is the advantage that after main subject region setting it is possible to move this region in accordance with the user's intentions.

Next a first modified example of special image processing will be described using the flowchart shown in FIG. 12. With this first modified example, it is possible to have a swipe operation, a rotation operation and a push operation as touch operations.

Figure 9:
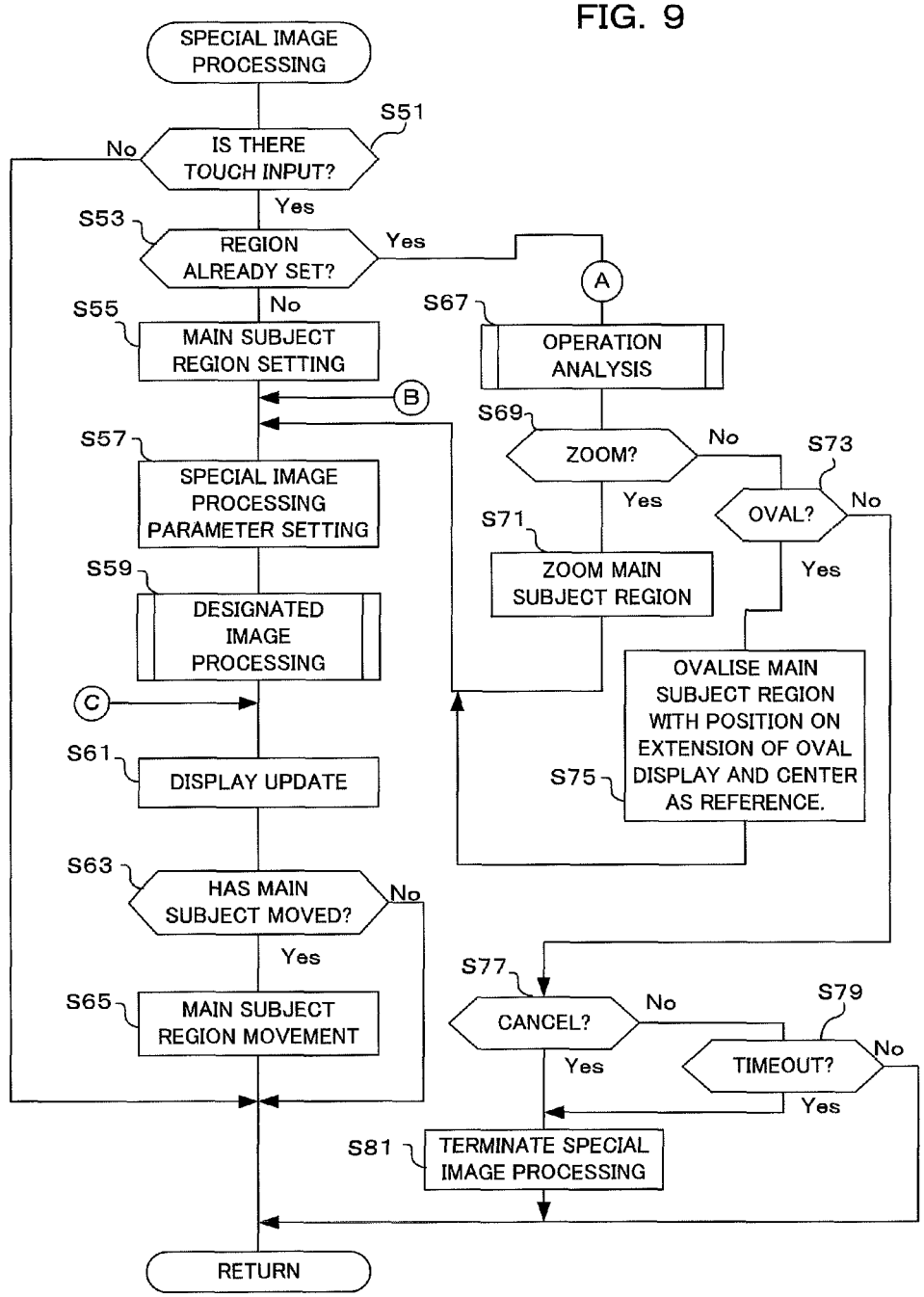
FIG. 9 is a flowchart for describing main operation of special image processing of the digital camera of one embodiment of the present invention.
Figures 10A, 10B:
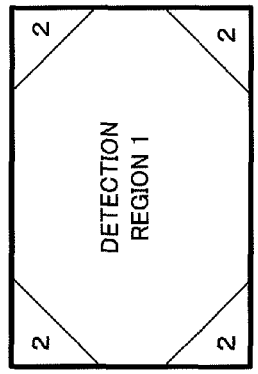
FIG. 10A and FIG. 10B are charts showing one example of operation analysis, in the digital camera of one embodiment of the present invention.
Figure 12:
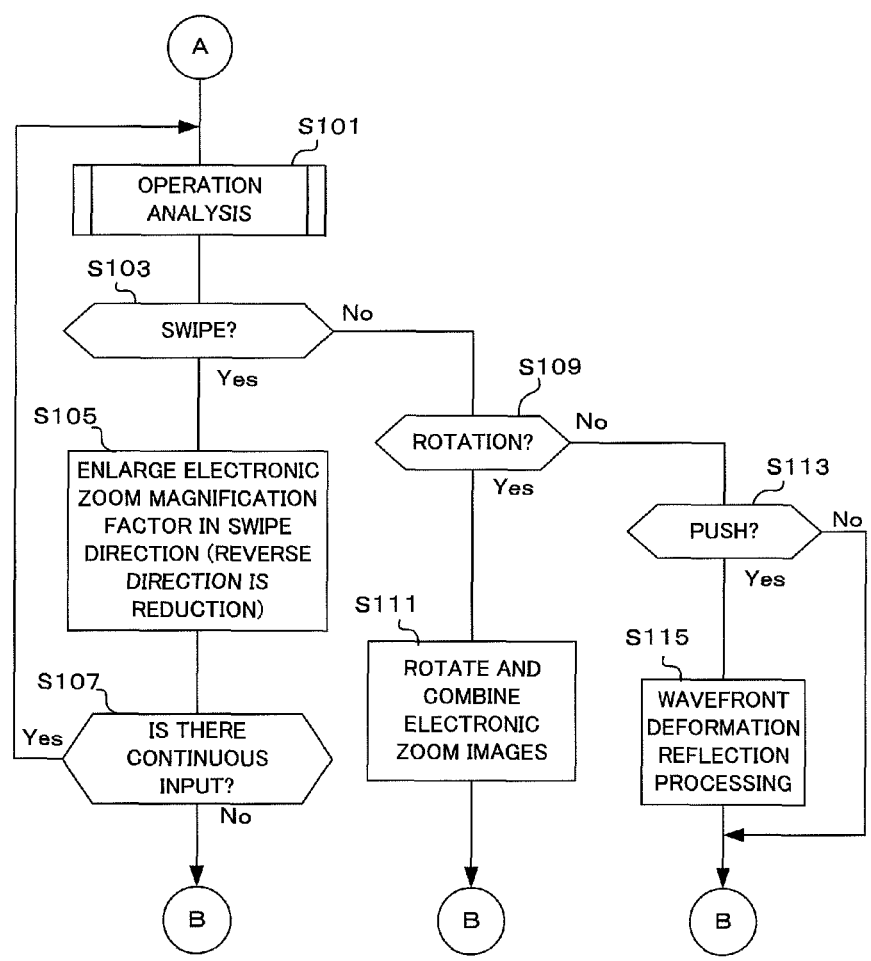
FIG. 12 is a flowchart for describing operation of a first modified example of special image processing of the digital camera of one embodiment of the present invention.

The flow shown in this first modified example has steps S67 to S75 of FIG. 9 replaced with FIG. 12, while the remaining steps are the same and are therefore omitted. If the result of determination in step S59 (FIG. 9) is that the region has already been set, the operation analysis is carried out (S101). With this modified example, as operation analysis, analysis is carried out for a swipe operation, a rotation operation and a push operation. This operation analysis will be described later using FIG. 13 to FIG. 15.

Once operation analysis has been carried out, it is next determined whether or not there was a swipe (S103). A swipe is carrying out a slide operation so as to stroke on the display surface of the image display section 17. Determination in this step is in accordance with operation analysis results. If the result of this determination is that there was a swipe, an electronic zoom magnification factor is enlarged in the swipe direction, while in the case of a swipe in the opposite direction the electronic zoom magnification factor is reduced (S105). It should be noted that electronic zoom processing is carried out by clipping images in the image processing circuit 257.

Once the processing of step S105 has been carried out, it is determined whether or not there is continuous input (S107). A swipe operation is carried out continuously, and in this step determination is based on whether or not the swipe operation is continuing. If the result of this determination is that there is continuous input processing returns to step S101. On the other hand processing proceeds to step S57 (FIG. 9), and special effect image processing is carried out.

If the result of determination in step S103 is that there is not a swipe, it is determined whether or not there is a rotation (S109). Rotation is carrying out a touch operation so as to plot a circle on the display surface of the image display section 17. Determination in this step is in accordance with operation analysis results. If the result of this determination is that there is a rotation, electronic zoom images are subjected to rotational combination (S111). Specifically, a special effect image having rotation further added to zooming is generated by carrying out processing to perform additive combination by rotating combined images with the image center as a reference. If the electronic zoom images have been rotationally combined, processing advances to step S57 (FIG. 9) and special effect image processing is carried out.

If the result of determination in step S109 is that there is no rotation, it is detected whether or not there has been a push (S113). A push is the user applying pressure on the display surface of the image display section 17 by pushing. This step is in accordance with operation analysis results, but a pressure condition is understood based on a detection result of operation pressure p from the input detection section 3.

If the result of determination in step S113 is that there has been a push, wavefront deformation reflection processing is carried out (S115). The wavefront deformation reflection processing (ripple processing) is image processing to create a type of effect as if a wave that has been generated on the surface of water is spreading outwards. Once the wavefront deformation reflection processing has been carried out, or in the event that the determination result in step S113 is that there was not a push, processing advances to step S57 (FIG. 9) and special effect image processing is carried out.

Next, an example of the operation analysis will be described using FIG. 13 to FIG. 15. FIG. 13 is analysis of a case where a swipe operation has been performed by the user. The expression $|\Delta x1|$ in the upper row of FIG. 13 represents change amount for a slide operation, and V1 represents velocity at the time of a swipe operation (detected as velocity v in the input detection section 3). In accordance with $|\Delta x1|$ and velocity V1, as shown in FIG. 13, any one of zoom, small slide, zoom, or large swipe is set as an operation, and zoom in all directions or enlargement of a zoom ratio in the swipe direction is performed as image processing.

Specifically, in a case where change amount for the slide operation $|\Delta x1|$ is smaller than a predetermined given value (0), a zoom change amount for image processing is made small, while in a case where change amount for the slide operation $|\Delta x1|$ is larger than a predetermined given value (1), zoom change amount for image processing is made large. Also, in a case where velocity V1 is less than a predetermined given value V0 (0) a zoom change direction for image processing is made all directions, while when velocity V1 is greater than or equal to the predetermined given value V0 (1) zoom change direction for image processing is made the direction in which the swipe was performed. In this way it is possible to carry out change of image processing depending on a swipe operation method.

Figures 14A, 14B:
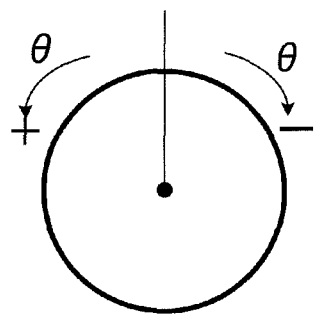
FIG. 14A and FIG. 14B are charts showing one example of operation analysis of a first modified example, in the digital camera of one embodiment of the present invention.

Next, analysis for a case where a rotation operation has been performed will be described using FIG. 14A and FIG. 14B. A rotation operation is carrying out an operation by sliding a finger F so as to draw a circle, in a state where the finger F is placed on the main subject region. As shown in FIG. 14B, if operation is in a clockwise direction it is a minus direction, and if operation is in an anticlockwise direction it is a plus direction. In accordance with respective position change amounts $\Delta x1$ and $\Delta x2$ for touch positions at two points, image processing is changed, as shown in FIG. 14A. In this way it is possible to carry out change of image processing depending on a rotation operation method. The example shown in FIG. 14A and FIG. 14B is an example of a rotation operation at two points, but this is not limiting and it may be a rotation operation at one point, or may be a rotation operation at three or more points. In this case the number of types of image processing that can be identified is different.

Next, analysis for a case where a push operation has been performed will be described using FIG. 15. A push operation is an operation of applying pressure to the display surface of the image display section 17 in a state where a finger F is placed on the main subject region, and is detected as operation pressure p by the input detection section 3. In FIGS. 15 P1 and P2 represent respective pressures in the case where pressure has been applied at two points, and P0 represents a given pressure. As shown in FIG. 15, image processing differs depending on combinations of pressing force at two points. It should be noted that the example shown in FIG. 15 is an example where a push operation has been performed at two points, but this is not limiting and a push operation may be performed at one point, or a push operation may be performed of three or more points. In this case the number of types of image processing that can be identified is different.

In this way, with the first modified example of the special image processing of the one embodiment of the present invention, the special effect image processing is changed depending on a swipe, rotation or push operation. This means that it is possible to change special effect image processing rapidly and easily with a simple action. It should be noted that in conjunction with the operation analysis in step S67 of the one embodiment of the present invention, the accompanying special effect image processing may also be carried out.

Next, a second modified example of the special image processing of the one embodiment of the present invention will be described using FIG. 16 and FIG. 17. With this modified example it is possible to manually designate the effect intensity. With this modified example, the processing of steps S51 to S59 in the flowchart of FIG. 9 relating to the one embodiment of the present invention is replaced steps S201-S257 in the flowcharts of FIG. 16 and FIG. 17.

Figure 16:
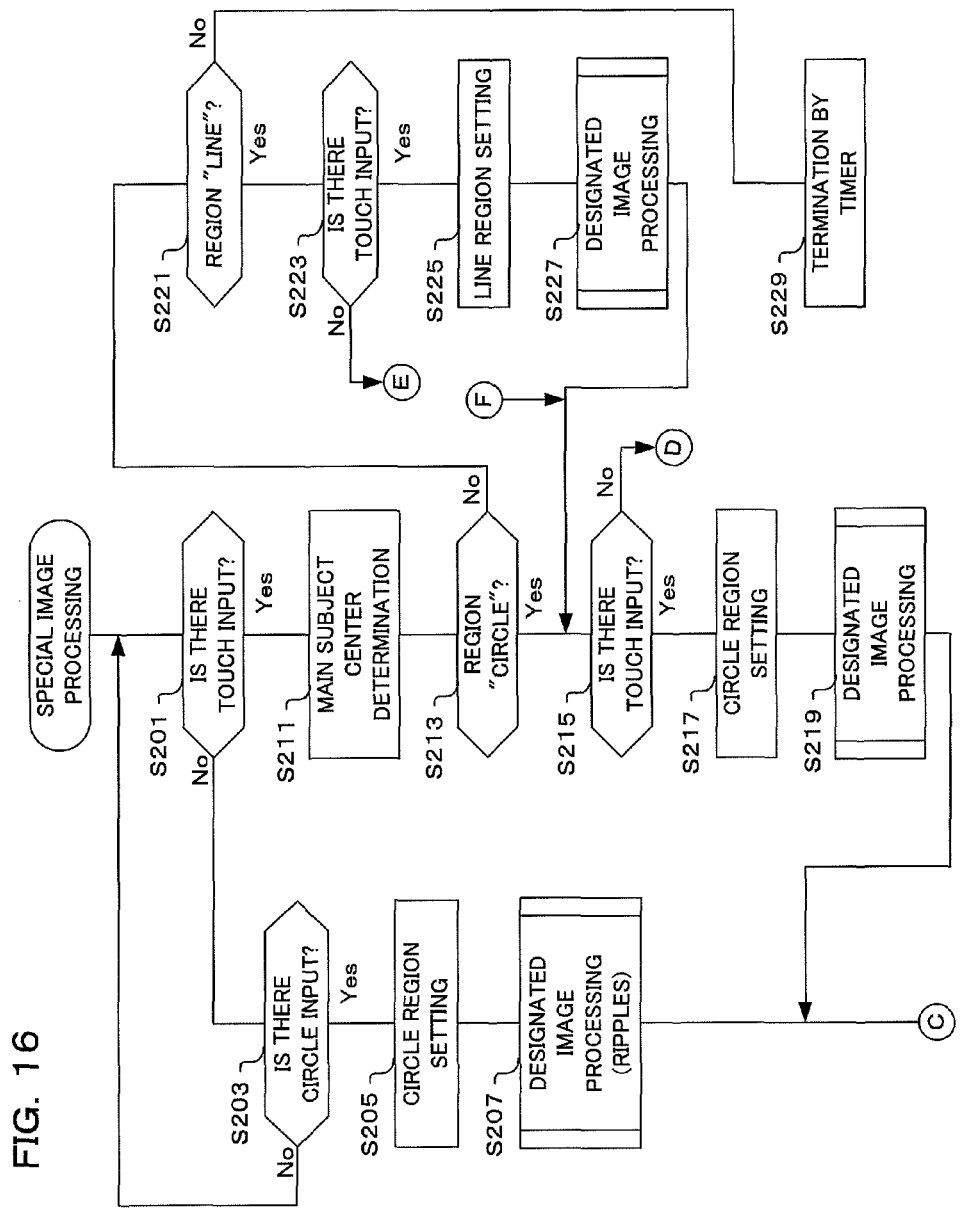
FIG. 16 is a flowchart for describing operation of a second modified example of special image processing of the digital camera of one embodiment of the present invention.

If the flow for the special image processing shown in FIG. 16 is entered, it is first determined whether or not there is touch input (S201). Here it is determined whether or not there has been a touch operation, touching a single point, based on a detection result of the input detection section 3 that has been output from the touch output section 1, as was described using image P3 in FIG. 5.

If the result of determination in step S201 is that there is no touch input, it is determined whether or not there is circle input (S203). Here it is determined whether or not there has been a slide operation, such as drawing an enclosing trace, based on a detection result of the input detection section 3 that has been output from the touch output section 1, as was described using image P4 in FIG. 5. If the result of this determination is that there is no circle input, processing returns to step S201.

If the result of determination in step S203 is that there is circle input, circle region setting is carried out (S205). Here, the main subject region update section 9 sets a circle region that approximates to the trace by the slide operation, as in image P4 in FIG. 5.

Once the circle region setting has been carried out, next designated image processing (ripple) is carried out (S207). Here, the special effect image processing section 15 applies image processing to create a type of effect where ripples generated on a water surface appears to be moving, to a region other than the main subject region (refer to image P19 in FIG. 6). Once the designated image processing has been carried out, processing advances to step S61 (FIG. 9).

Processing returns to step S201, and if the result of this determination is that there is touch input, determination of main subject center is carried out (S211). Here, the touch operation position that has been detected is determined to be the center point of the main subject, as shown in image P3 in FIG. 5.

Once the main subject center has been determined, it is next determined whether or not a region is a "circle" (S213). Since the shape of the main subject region has been set in advance, in this step determination is in accordance with this shape that has been set.

If the result of determination in step S213 is that the region is a "circle", it is next determined whether or not there is touch input (S215). Here whether or not a touch operation has been performed is determined based on detection output from the input detection section 3.

If the result of determination in step S215 is that there is touch input, circle region setting is carried out (S217). Image P11 in FIG. 5 is a case where a touch operation has been performed. In this step the main subject region update section 9 sets a circular shape as the main subject region.

Once the circle region setting has been carried out, next designated image processing is carried out (S219). Here, the special effect image processing section 15 carries out special effect image processing on a region other than the circular main subject region. The example shown in image P12 in FIG. 6 is a case where special effect image processing has been performed in a case where the effect intensity is set to a default value. Once the designated image processing of step S219 has been carried out, processing advances to step S61 (FIG. 9).

Figure 17:
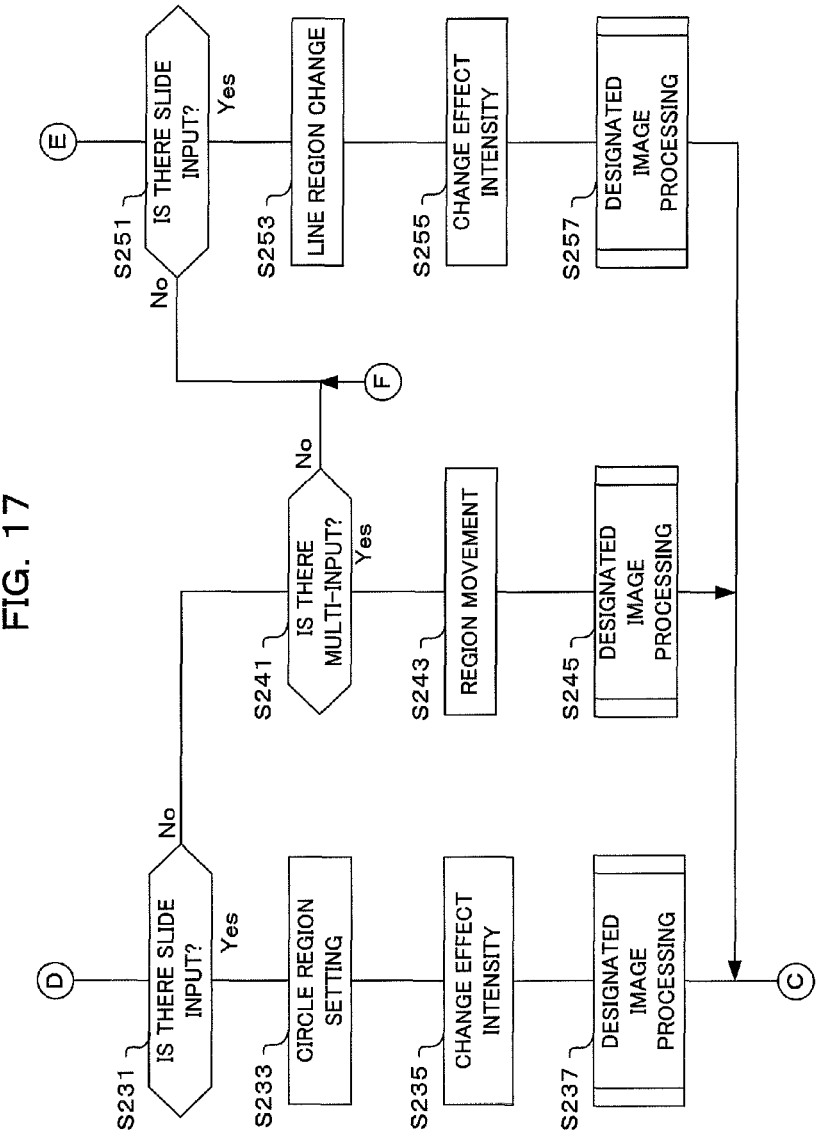
FIG. 17 is a flowchart for describing operation of a second modified example of special image processing of the digital camera of one embodiment of the present invention.

If the result of determination in step S215 is that there is no touch input, it is determined whether or not there is slide input (S231, FIG. 17). Here, whether the user's finger has been slid on the display screen of the image display section 17 (whether there has been a slide operation) is determined based on a detection result from the input detection section 3.

If the result of determination in step S231 is that there is slide input, circle region setting is next carried out (S233). In the event that a slide operation has been performed, the main subject region update section 9 sets a circular shape as the main subject region as in image P13 in FIG. 6, for example.

Once a circular region has been set, next change of the effect intensity is carried out (S235). If a slide operation has been carried out, movement velocity v and operation pressure p are detected based on detection results from the input detection section 3. The effect intensity is changed using this detection result.

Once the effect intensity has been changed, designated image processing is carried out (S237) Here, the special effect image processing section 15 carries out special effect image processing on a region other than the circular main subject region, in accordance the effect intensity in step S235. The example shown in image P14 in FIG. 6 is a case where special effect image processing has been carried out in accordance with effect intensity. Once the designated image processing of step S237 has been carried out, processing advances to step S61 (FIG. 9).

Processing returns to step S231, and if the result of this determination is that there is no slide input, it is determined whether or not there is multi-input (S241). With this modified example, if a slide operation is carried out on the main subject region with two fingers at the same time (in the same direction and at the same velocity), it is possible to perform movement of the region. Here, whether or not there is multi-input is determined based on the detection results from the input detection section 3. If the result of this determination is that there is not multi-input, processing advances to step S215 (FIG. 16).

If the result of determination in step S241 is that there is multi-input, region movement is performed (S243). Here the main subject region is moved based on detection results from the input detection section 3. The example shown in image P20 in FIG. 6 shows movement of the main subject region.

Once the region movement has been carried out, next designated image processing is carried out (S245). Here after the main subject region has been moved, special effect image processing is applied to a region other than the main subject region. Once the designated image processing of step S245 has been carried out, processing advances to step S61 (FIG. 9).

Processing returns to step S213 (FIG. 16), and if the result of this determination is not that a region is a "circle" it is next determined whether or not the region is a "line" (S221). Here, it is determined whether or not the main subject region has been set to "line" in advance. If the result of this determination is that "line" has not been set, there is termination by a timer (S229). Here, if there has been no operation at all for a given time, the flow for special image processing is terminated and the originating flow is returned to.

If the result of determination in step S221 is that region "line" has been set, it is next determined whether or not there has been touch input (S223). Here whether or not a touch operation has been performed is determined based on detection output from the input detection section 3.

If the result of determination in step S223 is that there is touch input, line region setting is carried out (S225). Image P15 in FIG. 6 is a case where a touch operation has been performed. In this step the main subject region update section 9 sets a rectangular shape as the main subject region.

Once the line region setting has been carried out, next designated image processing is carried out (S227). Here, the special effect image processing section 15 carries out special effect image processing on a region other than the line region (rectangular) main subject region. The example shown in image P16 in FIG. 6 is a case where special effect image processing has been performed in a case where the effect intensity is set to a default value. Once the designated image processing of step S227 has been carried out, processing advances to step S61 (FIG. 9).

If the result of determination in step S223 is that there is no touch input, it is determined whether or not there is slide input (S251, FIG. 17). Here, whether the user's finger has been slid on the display screen of the image display section 17 (whether there has been a slide operation) is determined based on a detection result from the input detection section 3.

If the result of determination in step S251 is that there is slide input, line region setting is next carried out (S253). In the event that a slide operation has been performed, the main subject region update section 9 sets a line region (rectangular shape) as the main subject region, as in image P17 in FIG. 6, for example.

Once the line region has been set, next change of effect intensity is carried out (S255). If a slide operation has been carried out, movement velocity v and operation pressure p are detected based on detection results from the input detection section 3. The effect intensity is changed using this detection result.

Once the effect intensity has been changed, designated image processing is carried out (S257). Here, the special effect image processing section 15 carries out special effect image processing on a region other than the line region main subject region, in accordance the effect intensity in step S255. The example shown in image P18 in FIG. 6 is a case where special effect image processing has been carried out in accordance with effect intensity. Once the designated image processing of step S257 has been carried out, processing advances to step S61 (FIG. 9).

In this way, with the second modified example of special image processing of the one embodiment of the present invention, it is made possible to change effect intensity with the manual operation (S235, S255). Specifically, it is possible to change effect intensity based on movement velocity and pressing force at the time of a slide operation. As a result it is possible to apply the special effect at a level in accordance with the user's intentions.

Has been described above, the one embodiment and the modified examples of the present invention comprise an operation input detector for detecting a touch operation on a display screen of a display (for example the touch output section 1 and the input detection section 3), an image position selection section for selecting position of part of an image that has been displayed on a image display section 17 (for example, the touch panel and the focus position), an image identification section for recognizing an image region that has been selected based on image position that has been selected by the image position selection section as a main subject image region (for example, the main subject size detection section 7), an image region changing section for changing a main subject region that has been identified in accordance with at least one of pressure, position change, direction, velocity, and displacement amount that have been detected by the operation input detector (for example, the main subject region update section 9), and a special image processing section 15 for applying special effect image processing to a region other than at least part of the main subject region that has been selected. As a result it is possible to easily change the region that will be subjected to special effect image processing.

Also, with the one embodiment and modified examples of the present invention, an image region change section (for example, the main subject region update section 9) can change a main subject region that has been identified by an image identification section (for example, the main subject region update section 9), to a region that has been detected by an operation input detector (refer, for example, to image 20 in FIG. 6). Since it is possible to change a region that is to be subjected to special effect image processing with a touch operation, it can be done with a simple operation.

Also, with the one embodiment and modified examples of the present invention, an image region change section (for example the main subject region update section 9) changes a main subject image region in accordance with at least one of pressure, position change, direction, velocity, or displacement amount that has been detected by an operation input detector (for example, the touch output section 1 and input detection section 3). It is also possible to change effect intensity.

Also, with the one embodiment and modified examples of the present invention, an operation input detector (for example, the touch output section 1 and input detection section 3) respectively detects an instruction to fix part of an image region and a instruction to change part of an image region, within a plurality of touch operations.

Also, with the one embodiment and modified examples of the present invention, an operation input detector (for example, touch output section 1 and input detection section 3) changes special effect image processing in accordance with time based on a plurality of touch operations.

Also, with the one embodiment and modified examples of the present invention, an operation input detector (for example, touch output section 1 and input detection section 3), cancels special effect image processing in a case where a touch operation has been detected at a given position (refer to S77 in FIG. 9 and the detection regions 2 in FIG. 10B). As a result it is possible to cancel special effect image processing with a touch operation, and an instruction can be issued rapidly.

It should be noted that in the one embodiment and modified examples of the present invention, input designation for special effect image processing has been carried out using a touch operation on a display screen of the image display section 17, but this is not limiting, and an operation input detector for detecting gestures close to the display screen may also be provided, for example. For example, gestures in the vicinity of the display screen may be detected, and a main subject region may be changed to a region corresponding to a gesture that has been detected. Also, as another example, movements of a person's right index finger may be detected as a gesture, and recognized as different operations based on amount of change of respective movements, and for a main subject image region corresponding to a finger with a small movement change amount the region is fixed without being changed, while for a main subject image region corresponding to a finger with a large movement change amount the region is changed to a position corresponding to the movement, such that change in the main subject image region is different depending on the gesture. In this case, a circular region will be changed to an oval region. A gesture detection section in this case functions as an operation input detector for detecting gestures close to a display screen of a display section.

Also, each function within the image processing circuit 257 and the subject determination circuit 255, as well as being hardware circuits, may be implemented as circuits for executing programs, such as a DSP (Digital Signal Processor), and may also be implemented as peripheral circuits to a CPU (Central Processing Unit) and program code.

Further, with the one embodiment and modified example of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc. In any event, the present invention may be adopted in any apparatus for carrying out special effect image processing.

The present invention is not limited to an apparatus for taking pictures, and can also be adopted in a personal computer that is capable of storing image data, or a playback device etc. In this case, special effect image processing is applied at the time of playback (refer to S35 in FIG. 8). It is therefore possible to apply the present invention to an apparatus or a program for playback.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image displaying apparatus, comprising:
   a display which displays a still picture or movie image that has been taken,
   an operation input detector which detects at least one of pressure, position change, direction, or velocity resulting from a touch operation on a display screen of the display,
   an image position selection section which selects position of part of an image that has been displayed on the display,
   an image identification section which recognizes an image region that has been selected based on image position that has been selected by the image position selection section, and at least one of position change and direction that have been detected by the operation input detector, as a main subject image region, and
   a special image processing section which applies special effect image processing to a region other than at least part of the main subject image region that has been selected, wherein
   the special image processing section varies the special effect processing intensity in accordance with at least one of pressure and speed of a touch operation, in a direction from the main subject image region towards the screen periphery, that has been detected by the operation input detector, and
   when the main subject image region is set, the special effect image processing section clips images of a plurality of sizes from the image, as images that have been subjected to zooming, and generates a combined image after carrying out processing to make the plurality of clipped images the same size.

2. The image displaying of claim 1, wherein:
   the special image processing section applies special effect image processing to a peripheral region of a screen other than the main subject image region.

3. The image displaying of claim 1, wherein:
   the operation input detector respectively detects an instruction to fix part of the image region and an instruction to change part of the image region, within a plurality of actions of the touch operation.

4. The image displaying of claim 1, wherein:
the operation input detector changes the special effect image processing in accordance with time, based on a plurality of actions of the touch operation.

5. The image displaying of claim 1, wherein:
the operation input detector cancels the special effect image processing when the touch operation has been detected at a given position.

6. An image displaying method, comprising:
a display step of displaying a still picture or movie image that has been taken on a display,
an operation input detection step of detecting at least one of pressure, position change, direction, or velocity resulting from a touch operation on a display screen of the display,
a selection step of selecting position of part of an image that has been displayed on the display,
a recognition step of recognizing an image region that has been selected based on the selected image position, and at least one of position change and direction that have been detected in the operation input detection step, as a main subject image region, and
a special image processing step of applying special effect image processing to a region other than at least part of the main subject image region that has been selected, wherein
the special image processing step varies the special effect processing intensity in accordance with at least one of pressure and speed of a touch operation, in a direction from the main subject image region towards the screen periphery, that has been detected in the operation input detection step, and
when the main subject image region is set, the special effect image processing step clips images of a plurality of sizes from the image, as images that have been subjected to zooming, and generates a combined image after carrying out processing to make the plurality of clipped images the same size.

7. A non-transitory computer-readable medium storing a computer program for controlling a computing device, the computer program comprising:
a display step of displaying a still picture or movie image that has been taken on a display,
an operation input detection step of detecting at least one of pressure, position change, direction, or velocity resulting from a touch operation on a display screen of the display,
a selection step of selecting position of part of an image that has been displayed on the display,
a recognition step of recognizing an image region that has been selected based on the selected image position, and at least one of position change and direction that have been detected in the operation input detection step, as a main subject image region, and
a special image processing step of applying special effect image processing to a region other than at least part of the main subject image region that has been selected, wherein
the special image processing step varies the special effect processing intensity in accordance with at least one of pressure and speed that has been detected in the operation input detection step, and
when the main subject image region is set, the special effect image processing step clips images of a plurality of sizes from the image, as images that have been subjected to zooming, and generates a combined image after carrying out processing to make the plurality of clipped images the same size.

* * * * *